United States Patent [19]

Ekladyous et al.

[11] Patent Number: 5,403,048
[45] Date of Patent: Apr. 4, 1995

[54] MOVEABLE RADIATOR GRILLE ASSEMBLY

[75] Inventors: Albert S. Ekladyous, Shelby Township, Macomb County; James F. Healy, Bloomfield Hills; Joseph V. Dichtel, St. Clair Shores, all of Mich.

[73] Assignee: Ford Motor Company, Dearborn, Mich.

[21] Appl. No.: 134,440

[22] Filed: Oct. 12, 1993

[51] Int. Cl.6 .................................. B60R 19/54
[52] U.S. Cl. ........................... 293/115; 293/155; 248/298
[58] Field of Search ............... 293/102, 115, 137, 155; 248/305, 306, 316.7, 298, 299

[56] References Cited

U.S. PATENT DOCUMENTS

| | | |
|---|---|---|
| D. 156,659 | 12/1949 | Reed . |
| D. 204,446 | 4/1966 | Bardon . |
| 942,366 | 12/1909 | Deeter . |
| 1,866,691 | 7/1932 | Worley, Jr. et al. . |
| 2,148,847 | 2/1939 | Wiley . |
| 2,195,068 | 3/1940 | Wiley . |
| 2,724,882 | 11/1955 | Poupitch . |
| 2,751,653 | 6/1956 | Leibow . |
| 2,787,435 | 4/1957 | Shields ................. 248/306 X |
| 3,792,889 | 2/1974 | Fuener et al. ............ 293/115 |
| 3,970,346 | 7/1976 | Kretschmer . |
| 4,196,774 | 4/1980 | Hoffmann . |
| 4,541,645 | 9/1985 | Foeldesi . |
| 4,834,436 | 5/1989 | Nguyen ................ 293/115 |
| 4,944,540 | 7/1990 | Mansoor et al. ............ 293/115 |

FOREIGN PATENT DOCUMENTS

| | | | |
|---|---|---|---|
| 696666 | 10/1964 | Canada ................. 248/232 |
| 2561998 | 10/1985 | France ................. 180/68.4 |
| 3814007 | 4/1989 | Germany ............... 180/68.4 |
| 132807 | 4/1933 | Netherlands ........... 180/68.4 |
| 1001779 | 9/1965 | United Kingdom ......... 24/295 |

Primary Examiner—Dennis H. Pedder
Attorney, Agent, or Firm—Daniel M. Stock; Roger L. May

[57] ABSTRACT

A moveable radiator grille assembly for an automotive vehicle includes a grille, a bracket member connected to the grille for supporting the grille, support assemblies interconnecting the grille and vehicle structure for allowing movement of the grille relative to vehicle structure.

10 Claims, 5 Drawing Sheets

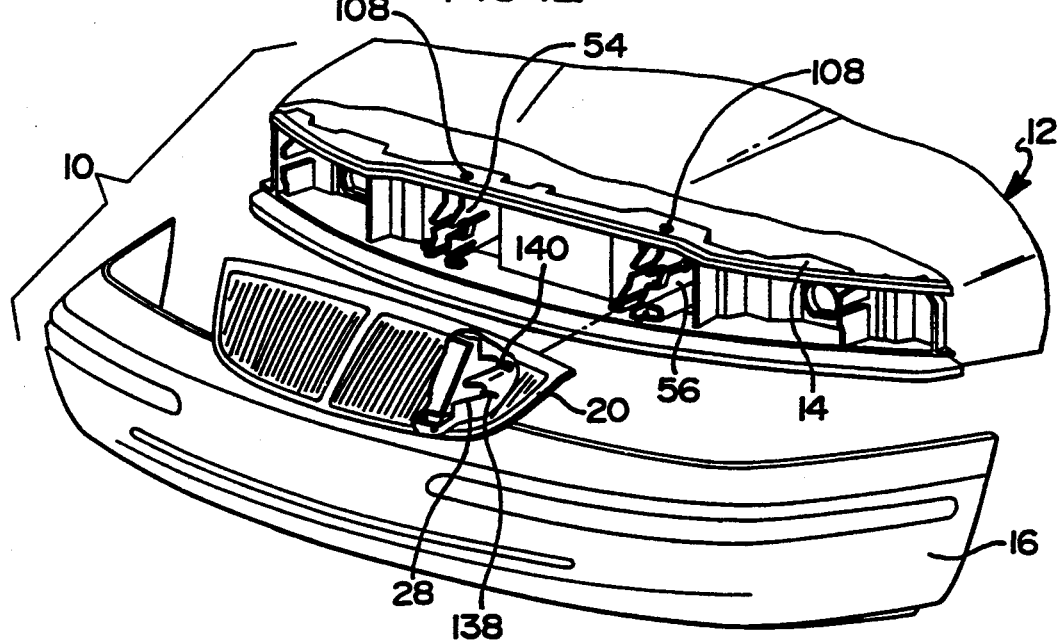
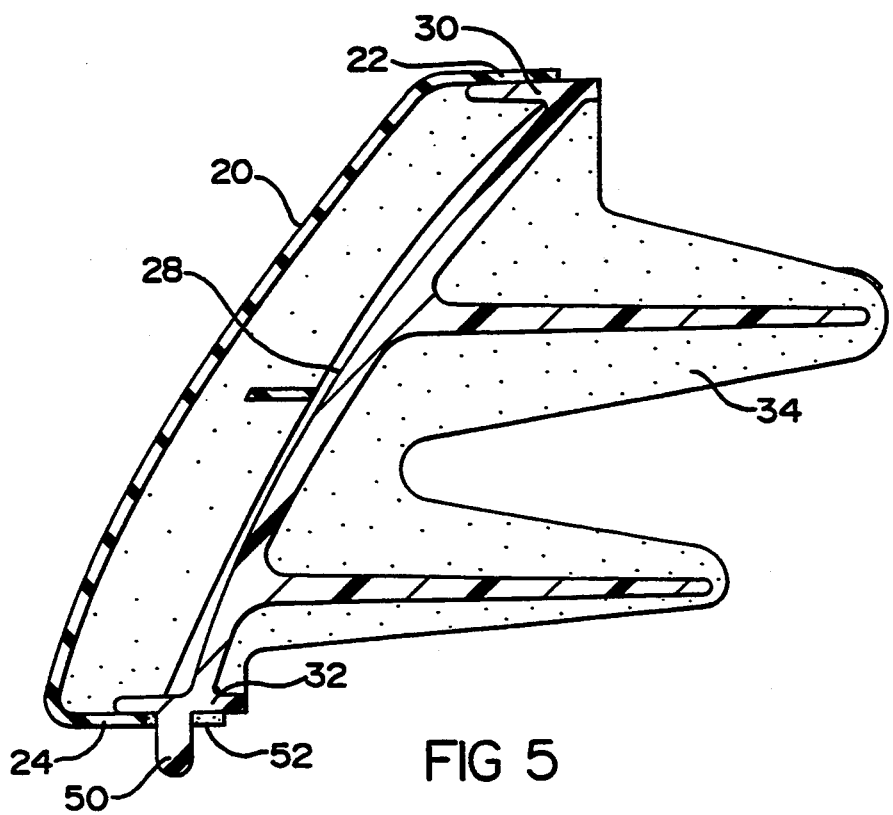

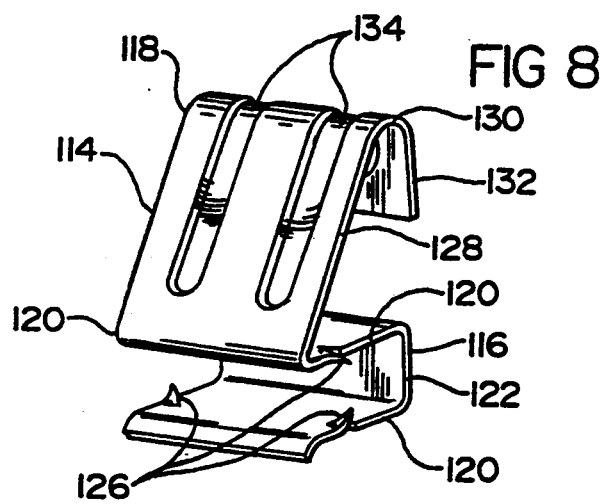
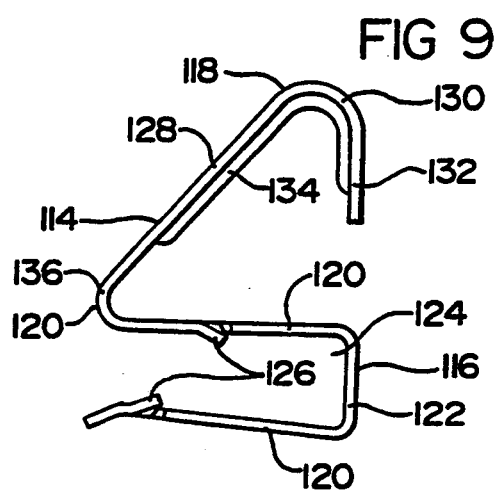
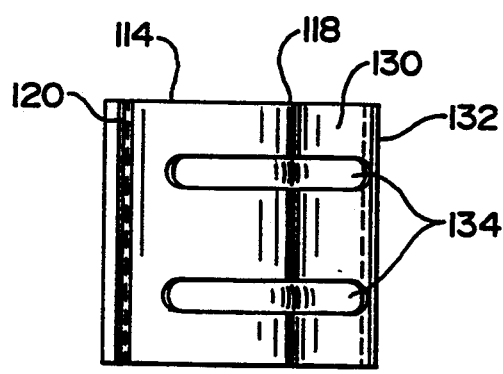
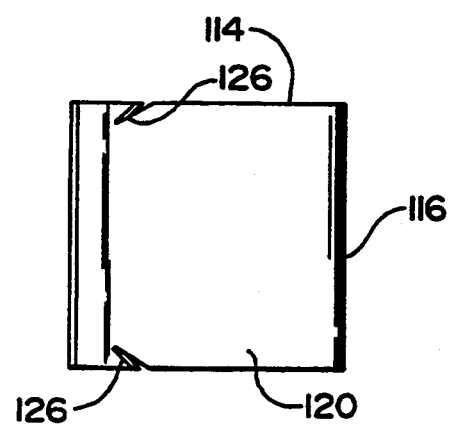

MOVEABLE RADIATOR GRILLE ASSEMBLY

BACKGROUND OF THE INVENTION

1. Field of the Invention

The present invention relates generally to radiator grilles for vehicles and, more specifically, to a moveable radiator grille assembly for an automotive vehicle.

2. Description of the Related Art

It is known to provide a radiator grille for a vehicle such as an automotive vehicle. Typically, the radiator grille is disposed longitudinally between a radiator and front bumper of the vehicle. Generally, the radiator grille is fixedly secured to vehicle structure with fasteners. Although the radiator grille provides a pleasing aesthetic appearance to the vehicle, it suffers from the disadvantage that it may be damaged or damage other components of the vehicle upon a collision type impact of the front bumper. Another disadvantage is that hand tools are required to assemble the radiator grille to the vehicle structure. A further disadvantage is that the radiator grille requires unique right and left hand support assemblies which requires two (2) sets of tooling for all individual components of the support assemblies.

SUMMARY OF THE INVENTION

Accordingly, the present invention is a moveable radiator grille assembly for an automotive vehicle including a grille and support means connected to the grille for supporting the grille. The moveable radiator grille assembly also include means interconnecting the support means and vehicle structure for allowing movement of the grille relative to the vehicle structure.

Also, the present invention is a support assembly for a radiator grille of an automotive vehicle including a support member connected to vehicle structure and having at least one slot for receiving a pin of a radiator grille. The support assembly also includes a housing disposed adjacent the slot and connecting means for connecting the housing to either side of the support member.

Additionally, the present invention is a locking spring clip for retaining a radiator grille on an automotive vehicle including a base portion having a recess for receiving stationary vehicle structure and a contact portion for contacting an arcuate portion of a radiator grille. The locking spring clip also includes means for allowing the contact portion to rotate relative to the base portion.

One feature of the present invention is that a moveable radiator grille assembly is provided for an automotive vehicle. Another feature of the present invention is that the radiator grille attaches rigidly to a front bumper cover and slides in guided slots in support assemblies which allow for very large translations and a variety of grille movements. Yet another feature of the present invention is that the moveable radiator grille assembly uses snap-in spring loaded components that require only hand tools to assemble to the vehicle. Still another feature of the present invention is that a snap-in locking spring clip holds cylindrical pins of the moveable radiator grille assembly in place by pushing the cylindrical pin beyond the clip without the use of additional tools. A further feature of the present invention is that the moveable radiator grille assembly allows a radiator grille to be placed practically anywhere forward in the vehicle (in the bumper impact zone) for increased "aero" styling without being damaged or damage other components during 5 m.p.h. federal testing guidelines and regulations. Yet a further, feature of the present invention is that left and right hand support assemblies are assembled from the same components, eliminating the need for unique left and right hand tooling. A still further feature of the present invention is that the tooling required for the support assemblies is cut in half because only one set of tooling is manufactured for all of the individual components of the support assemblies thereby saving time and money and reduce the complexity of sorting individual components and assembly operation.

Other features and advantages of the present invention will be readily appreciated as the same becomes better understood after reading the subsequent description taken in conjunction with the accompanying drawings.

BRIEF DESCRIPTION OF THE DRAWINGS

FIG. 5 is a sectional view taken along line 5—5 of FIG. 2.

FIG. 8 is a perspective view of yet another portion of the moveable radiator grille assembly of FIG. 1.

FIG. 9 is an elevational view of the portion of FIG. 8.

FIG. 10 is a plan view of the portion of FIG. 8.

FIG. 11 is a bottom view of the portion of FIG. 8.

FIG. 12 is a view similar to FIG. 1 illustrating partial assembly of the moveable radiator grille assembly.

DESCRIPTION OF THE PREFERRED EMBODIMENT(S)

Figure 1:
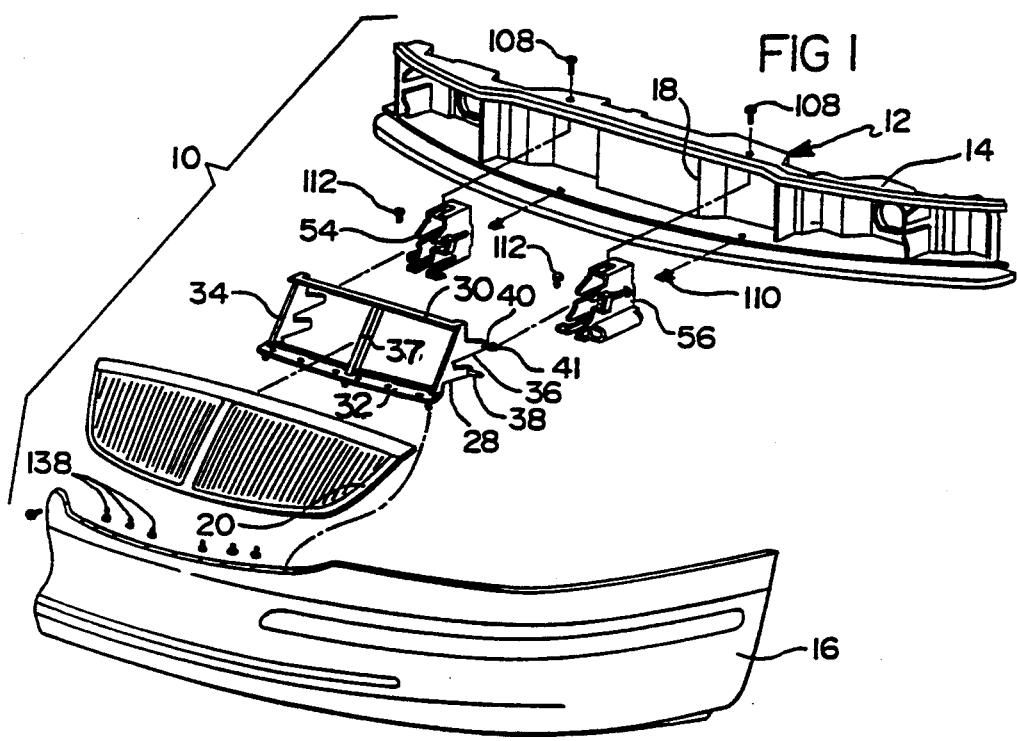
FIG. 1 is an exploded perspective view of a moveable radiator grille assembly, according to the present invention, illustrated in operational relationship with an automotive vehicle.

Turning to the drawings and in particular to FIG. 1 thereof, a moveable radiator grille assembly 10, according to the present invention, is illustrated in operational relationship with a vehicle such as an automotive vehicle, generally indicated at 12 and partially shown. The vehicle 12 includes vehicle structure such as a grille opening panel 14 extending laterally at a front end of the vehicle 12. The vehicle 12 also includes a front bumper cover 16 extending laterally. The moveable radiator grille assembly 10 connects the front bumper cover 16 to the grille opening panel 14. It should be appreciated that a radiator (not shown) is disposed behind an opening 18 in the grille opening panel 14.

Referring to FIGS. 1 through 5, the moveable radiator grille assembly 10 includes a grille 20 extending laterally. The grille 20 has an upper flange 22 and a lower flange 24 extending laterally and longitudinally. The grille 20 also has a plurality of apertures 26 spaced laterally and extending therethrough. The apertures 26 have a generally rectangular shape and extend generally vertically. The grille 20 is made of a plastic material. It should be appreciated that the apertures 26 allow air flow through the grille 20 to the radiator.

The moveable radiator grille assembly 10 also includes a bracket member 28 extending laterally to support the grille 20. The bracket member 28 has an upper support member 30 and a lower support member 32 extending laterally and longitudinally and spaced vertically. The support members 30,32 have a generally rectangular shape. The bracket member 28 also has a right hand support arm 34 and a left hand support arm 36 spaced laterally and interconnecting the upper and lower support members 30 and 32. The bracket member 28 also includes a central support member 37 interconnecting the upper and lower support members 30 and 32. The support arms 34 and 36 extend longitudinally and have a general "V" shape. The support arms 34 and 36 have upper and lower pins 38 and 40, respectively, extending laterally and generally perpendicular thereto for a function to be described. The pins 38 and 40 are generally cylindrically shaped and have at least one arcuate portion or outer surface. The upper pin 40 also has a flange 41 extending vertically for a function to be described. The bracket member 28 is made of a plastic material. It should be appreciated that the bracket member 28 is disposed behind the grille 20 and attached thereto.

Figure 3:
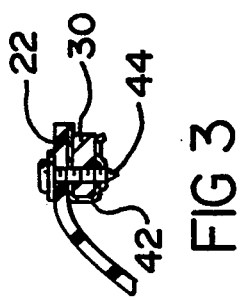
FIG. 3 is a sectional view taken along line 3—3 of FIG. 2.

Referring to FIG. 3, the moveable radiator grille assembly 10 includes a fastening clip 42 having a general U-shape which is placed over the upper support member 30. The upper flange 22 is disposed over the fastening clip 42. The moveable radiator grille assembly 10 includes a fastener 44 such as a screw which extends through the upper flange 22 and upper support member 30 and threadably engages the fastening clip 42.

Figure 4:
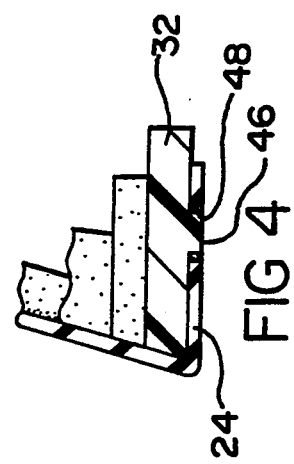
FIG. 4 is a sectional view taken along line 4—4 of FIG. 2.

Referring to FIG. 4, the lower support member 32 includes at least one, preferably a plurality of projections 46 extending generally perpendicular therefrom. The projections 46 are disposed in corresponding apertures 48 in the lower flange 24 of the grille 20. The lower support member 32 may also include pin members 50 which are disposed in corresponding slots 52 in the lower flange 24 of the grille 20 as illustrated in FIG. 5. It should be appreciated that the projections 46 and pin members 50 locate the bracket member 28 relative to the grille 20 and resist lateral movement therebetween.

Figure 6:
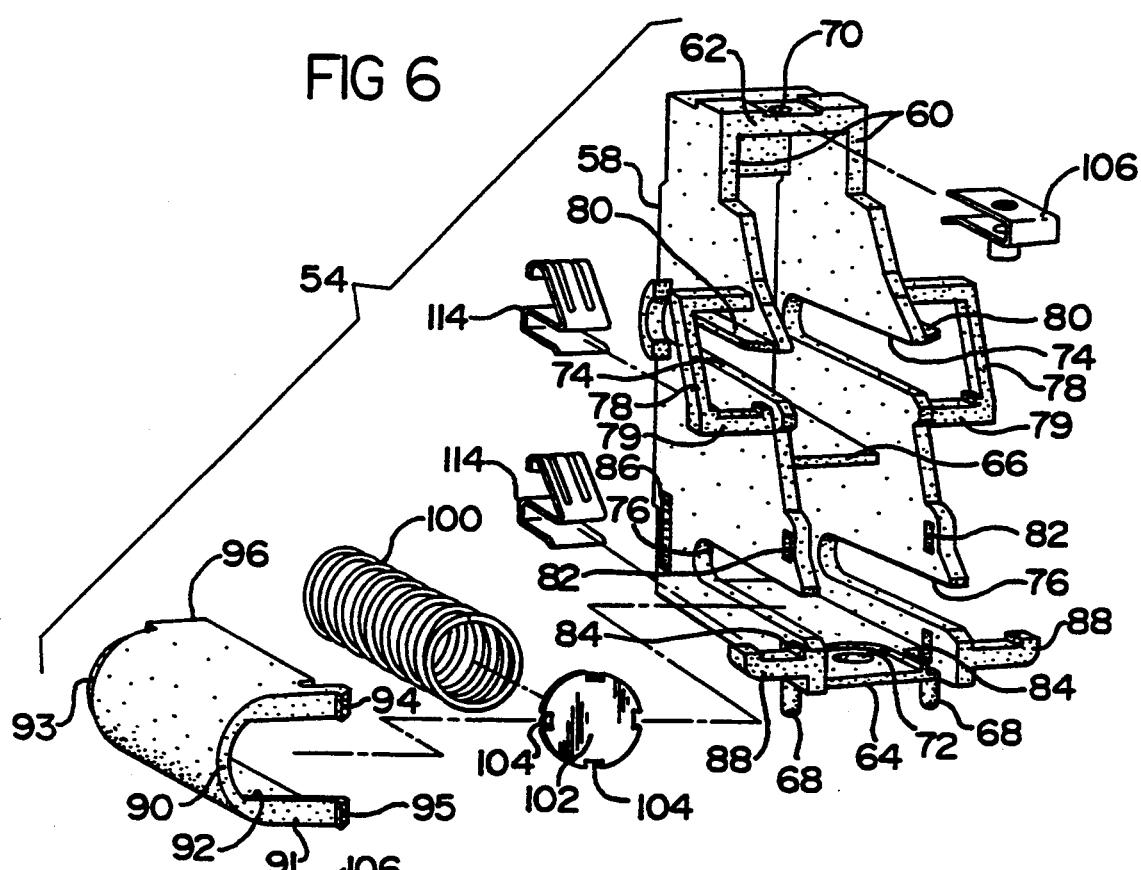
FIG. 6 is an exploded perspective view of another portion of the moveable radiator grille assembly of FIG. 1.
Figure 7:
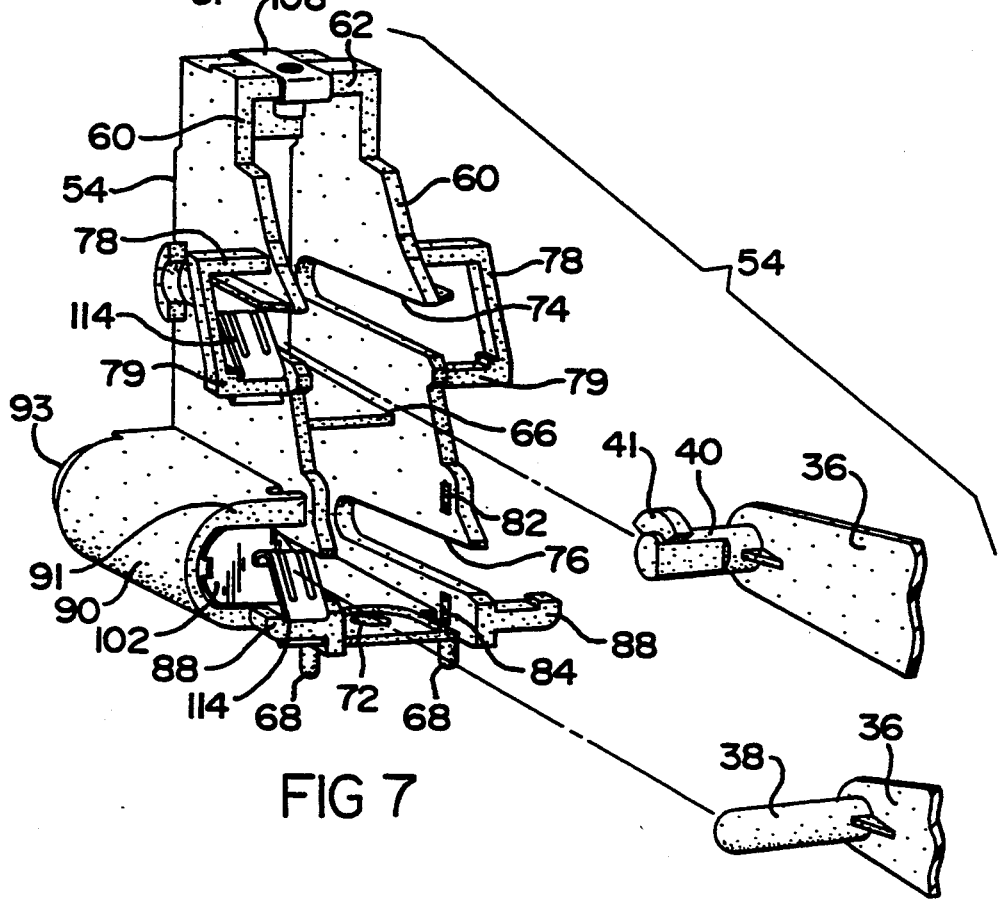
FIG. 7 is a view similar to FIG. 6 illustrating partial assembly of the portion of the moveable radiator grille assembly.

Referring to FIGS. 1, 6 and 7, the moveable radiator grille assembly 10 also includes right hand and left hand support assemblies, 54 and 56, respectively. The support assembly 54 includes a support member 58 having a pair of laterally spaced and vertically extending side walls 60. The side walls 60 are interconnected by a top wall 62, bottom wall 64 and interior wall 66. The bottom wall 64 has a pair of laterally spaced projections 68 for locating the support member 58 relative to the grille opening panel 14. The top wall 62 and bottom wall 64 include an aperture 70 and 72, respectively, extending therethrough. Each side wall 60 includes upper and lower grooves or tracks 74 and 76, respectively. The tracks 74 and 76 extend longitudinally for a function to be described. The upper track 74 has a guard member 78 with a support rib 79 and a general "C" shape connected to the side wall 60 over a front end of the track 74. The side wall 60 also includes a guide 80 at the inlet of the upper track 74 for a function to be described. The side wall 60 also includes upper and lower front apertures 82 and 84 extending laterally therethrough at a front end of the lower track 76. The side wall 60 further includes a rear aperture 86 spaced longitudinally from a rear end of the lower track 76 and extending laterally therethrough for a function to be described. The side wall 60 further includes a support rib 88 extending laterally at the front end of the lower track 76 for a function to be described.

The support assembly 54 also includes a spring housing 90 extending longitudinally and having a general "C" shape. The spring housing 90 has a front end wall 91 with an opening 92 and a rear end wall 93. The spring housing 90 also has upper and lower front tabs 94 and 95 and a rear tab 96. The upper and lower front tabs 94 and 95 are disposed in the upper and lower front apertures 82 and 84 of the side wall 60 and the rear tab 96 is disposed in the rear aperture 86 of the side wall 60 on a right hand side thereof. It should be appreciated that the tabs 94, 95 and 96 are flexible to deflect longitudinally and return to their original position to engage the apertures 82, 84 and 86, respectively, in the side wall 60. The support member 58 and spring housing 90 are made of a plastic material. It should also be appreciated that the support assembly 56 is similar to the support assembly 54 except that the spring housing 90 is disposed on a left hand side thereof.

The support assembly 54 also includes a spring 100 disposed within the spring housing 90 between the end walls 91 and 93 and the side wall 60. The spring 100 is preferably a linear compression coil spring. The support assembly 54 includes a spring cover 102 disposed about a front end of the spring 100. The spring cover 102 is a circular plate having tabs 104 to engage the spring 100. It should be appreciated that the spring urges the spring cover 102 toward the front end wall 91.

Referring to FIGS. 6 through 11, the moveable radiator grille assembly 10 also includes a locking spring clip 114 for retaining the pins 38,40 in the tracks 76,74 of the support member 58. The locking spring clip 114 has a base portion 116 for connection to the support member 58 and a contact portion 118 for contacting the pin 38,40. The locking spring clip 114 also includes a pivot portion 120 for allowing the contact portion 118 to rotate or pivot relative to the base portion 116. The base portion 116 has a pair of spaced side walls 120 and a base wall 122 interconnecting the side walls 120. The base wall 122 and side walls 120 form a generally rectangular shaped recess 124. The side walls 120 having a locking barb 126 extending inwardly at an angle into the recess 124 for a function to be described. The contact portion 118 has a planar wall 128 and a contact wall 130 generally arcuate at one end of the planar wall 128 and an end wall 132 extending toward the base portion 116 at an end of the contact wall 130. The planar wall 128 and contact wall 130 and end wall 132 are integral and formed as one piece. The planar wall 128 and contact wall 130 and end wall 132 may include at least one, preferably a pair of laterally spaced ribs 134. The hinged portion 120 includes a hinge wall 136 which is generally arcuate in shape and interconnects one of the side walls 120 and the planar wall 128. The base portion 116, hinged portion 120 and contact portion 118 are integral and formed as one piece. The locking spring clip 114 is preferably made of a metal material. It should be appreciated that the base portion 116, hinged portion 120 and contact portion 118 form a generally S-shaped profile for the locking spring clip 114.

The moveable radiator grille assembly 10 also includes a fastening clip 106 having a general U-shape which is placed over the top wall 62 and aligned with the aperture 70. The moveable radiator grille assembly 10 includes a fastener 108 such as a screw which extends through an upper flange of the grille opening panel 14 and top wall 62 and threadably engages the fastening clip 106. The moveable radiator grille assembly 10 includes a lower fastening clip 110 having a general U-shape which is placed over the bottom wall 64 of the support assemblies 54,56. The moveable radiator grille assembly 10 includes a fastener 112 such as a screw which extends through a lower flange of the grille opening panel 14 and bottom wall 64 and threadably engages the fastening clip 110. It should be appreciated that the fastening clips 106,110 and fasteners 108,112 fixedly secure the support assemblies 54,56 to the grille opening panel 14.

In operation, the spring cover 102 is assembled to the spring 100 by engagement of the tabs 104. The spring 100 and spring cover 102 are disposed within the spring housing 90. The tabs 94,95,96 of the spring housing 90 are disposed in corresponding apertures 82,84,86 of the side wall 60 on a right hand and left hand side of the support members 58 to form right hand and left hand support assemblies 54 and 56, respectively. The locking spring clip 114 is assembled to the support assemblies 54 and 56. The locking spring clip 114 is pushed on the support ribs 79 and 88 on right hand and left hand sides of the support assemblies 54 and 56. The locking barbs 126 engage the support ribs 79 and 88 and cause the side walls 120 to deflect outwardly. The support ribs 79 and 88 are disposed in the recesses 124 and contact the base wall 122. It should be appreciated that the locking barbs 126 engages the support ribs 79 and 88 to secure the locking spring clip 114 to the support ribs 79 and 88 and prevent longitudinal movement therebetween. The fastening clips 106,110 and fasteners 108,112 are used to secure the support assemblies 54,56 to the grille opening panel 14.

The bracket member 28 is disposed behind the grille 20 and the projections 46 and pin members 50 are disposed in the apertures 48 and slots 52, respectively. The fastening clip 42 and fastener 44 are used to secure the upper flange 22 to the upper support member 30. The front bumper cover 30 is disposed adjacent the lower flange 24 and fasteners 138 such as screws are used to secure the front bumper cover 30 and lower flange 24 and lower support member 32 together. It should be appreciated that the fastening clips (not shown) are used with the fasteners 138 and disposed over the lower support member 32.

Figure 13:
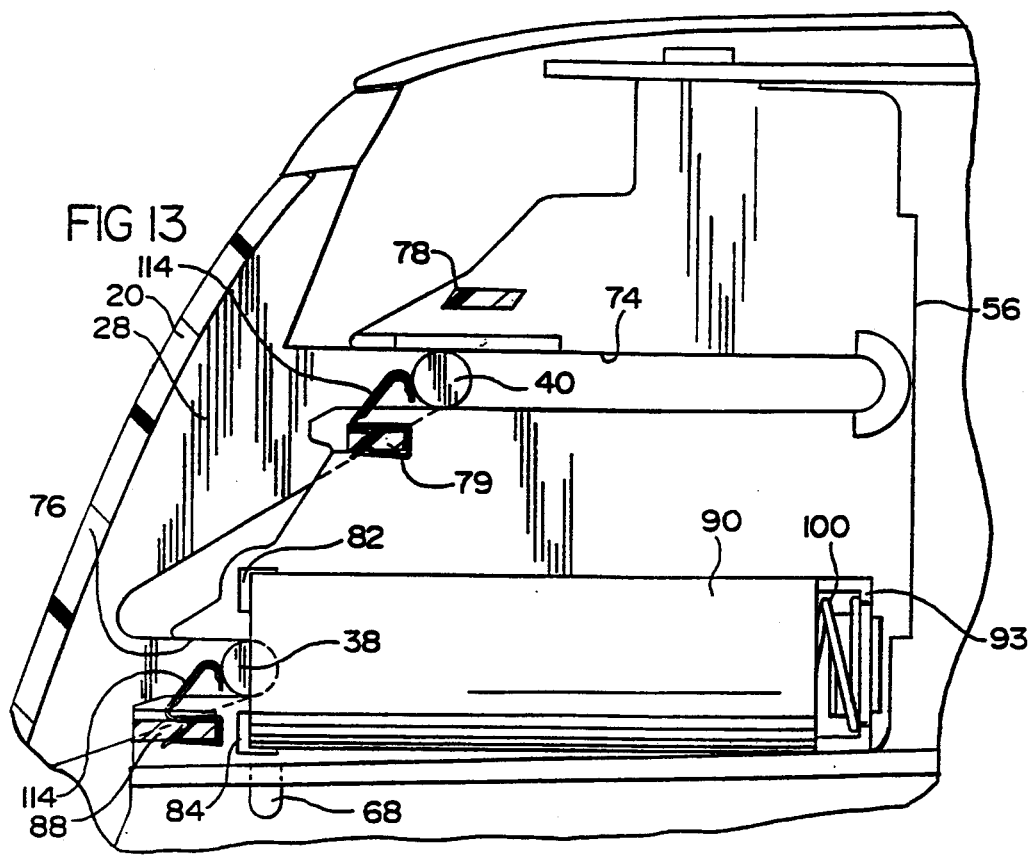
FIG. 13 is a fragmentary elevational view of the moveable radiator grille assembly of FIG. 1.
Figure 2:
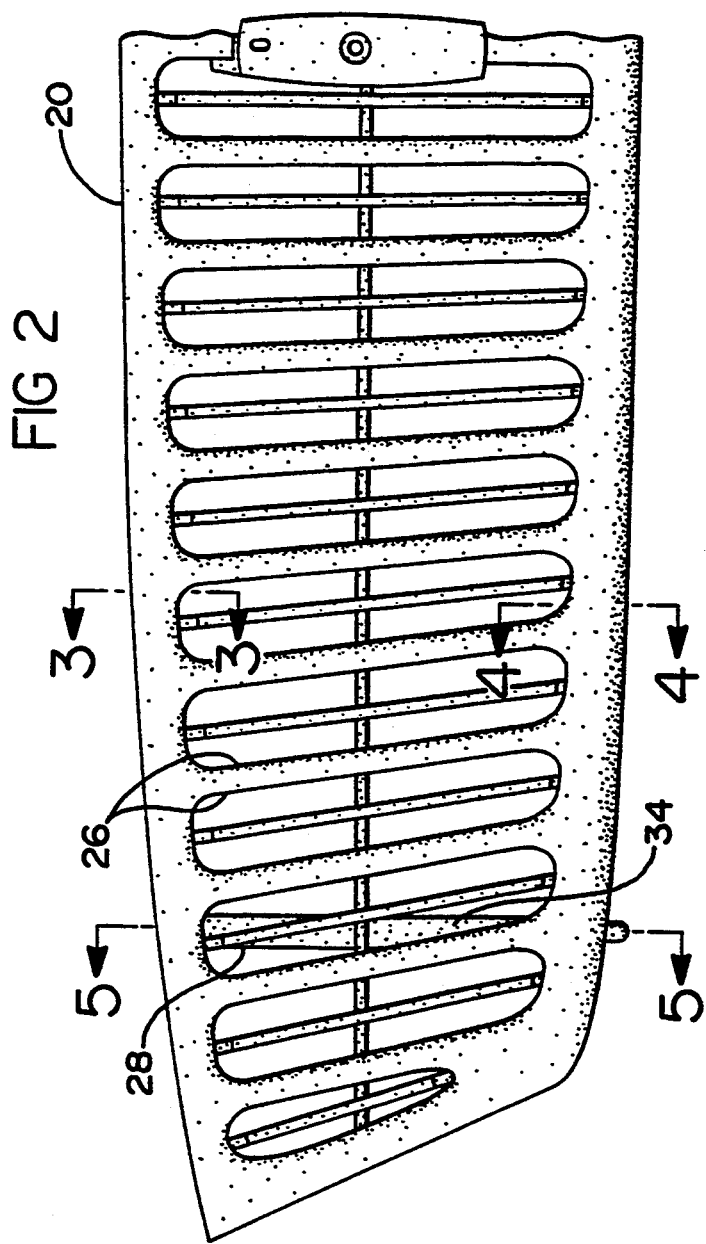
FIG. 2 is a partial elevational view of a portion of the moveable radiator grille assembly of FIG. 1.

Referring to FIGS. 12 and 13, the pins 38 and 40 are aligned with the tracks 76 and 74, respectively, of the support assemblies 54 and 56. The pins 38 and 40 are moved longitudinally to contact the contact wall 130 of the locking spring clips 114. The hinge portion 120 allows the contact portion 118 to deflect downwardly until the pin 38,40 are moved past the contact portion 118 and spring back up to its original position to lock on a back side of the pin 38,40. The spring 100 and spring cover 102 urge the pins 38,40 against the end wall 132 of the locking spring clip 114. The flange 41 also contacts the guide 80 to locate and center the bracket member 28 relative to the support assemblies 54,56. It should be appreciated that once the bracket member 28 is installed on the support assemblies 54,56 of the vehicle 12, the grille 20 is free to slide in tracks 74,76 fore/aft, up/-down, and side to side during bumper impact requirements. It should also be appreciated that the grille 20 can longitudinally stroke and return to its original position when a force impacts the front bumper cover 16.

Accordingly, the moveable radiator grille assembly 10 allows a radiator grille 20 to be placed practically anywhere in the bumper impact zone for increased aero/styling appeal without being damaged under large stroke requirements. The rigid attachment between the grille 20 and front bumper cover 16 eliminates the margin between the two components for styling enhancements and allows for a decreased package space requirements between the bumper beam and grille. The rigid attachment between the bracket member 28 and front bumper cover 16 supports that cover from sagging. The grille/bumper cover subassembly attaches to the vehicle 12 without the need for other tools. The spring 100 is engaged automatically by the lower pin 38 to maintain fit and finish.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A moveable radiator grille assembly for an automotive vehicle comprising:
   a grille;
   a bracket member connected to said grille and having at least one pin extending laterally;
   at least one support assembly for connection to vehicle structure and having at least one slot therein for receiving said at least one pin for allowing movement of said grille relative to the vehicle structure; and
   clip means connected to said at least one support assembly for retaining said at least one pin in said at least one slot.

2. A moveable radiator grille assembly for an automotive vehicle comprising:.
   a grille;
   a bracket member connected to said grille and having at least one pin extending laterally;
   at least one support assembly for connection to vehicle structure and having at least one slot therein for receiving said at least one pin for allowing movement of said grille relative to the vehicle structure;
   clip means connected to said at least one support assembly for retaining said at least one pin in said at least one slot; and
   spring means for urging said at least one pin toward said clip means.

3. A moveable radiator grille assembly for an automotive vehicle comprising:
   a grille;
   a bracket member connected to said grille and having at least one pin extending laterally;
   at least one support assembly for connection to vehicle structure and having at least one slot therein for receiving said at least one pin for allowing movement of said grille relative to the vehicle structure;
   clip means connected to said at least one support assembly for retaining said at least one pin in said at least one slot;

spring means for urging said at least one pin toward said clip means; and housing means on either side of said support assembly for housing said spring means.

4. A moveable radiator grille assembly as set forth in claim 3 including connecting means for connecting said housing means to either side of said support assembly.

5. A support assembly for a radiator grille of an automotive vehicle comprising:

a support member for connection to vehicle structure having a pair of laterally spaced side walls and a top wall and bottom wall interconnecting said side walls, each of said side walls including at least one slot for receiving a pin of a radiator grille;

a housing disposed adjacent said at least one slot; and connecting means for connecting said housing to either one of said side walls of said support member.

6. A support assembly for a radiator grille of an automotive vehicle comprising:

a support member for connection to vehicle structure having at least one slot on opposed sides for receiving a pin of a radiator grille;

a housing disposed adjacent said at least one slot;

connecting means for connecting said housing to either side of said support member; and said connecting means comprising at least one aperture extending through said support member adjacent each longitudinal end of said slot and at least one tab at each longitudinal end of said housing, said tabs being disposed in said apertures.

7. A support assembly as set forth in claim 5 wherein said housing is generally C shaped.

8. A support assembly for a radiator grille of an automotive vehicle comprising:

a support member for connection to vehicle structure having at least one slot on opposed sides for receiving a pin of a radiator grille;

a housing disposed adjacent said at least one slot;

connecting means for connecting said housing to either side of said support member; and clip means connected to said support assembly for retaining the pin in said at least one slot.

9. A support assembly as set forth in claim 8 including spring means for urging the pin toward said clip means.

10. A support assembly as set forth in claim 9 including means for closing one end of said spring means for contact with the pin.

* * * * *